June 3, 1958 W. J. GRUEN 2,837,595
SIGNAL SEPARATION CIRCUIT
Filed Feb. 1, 1954
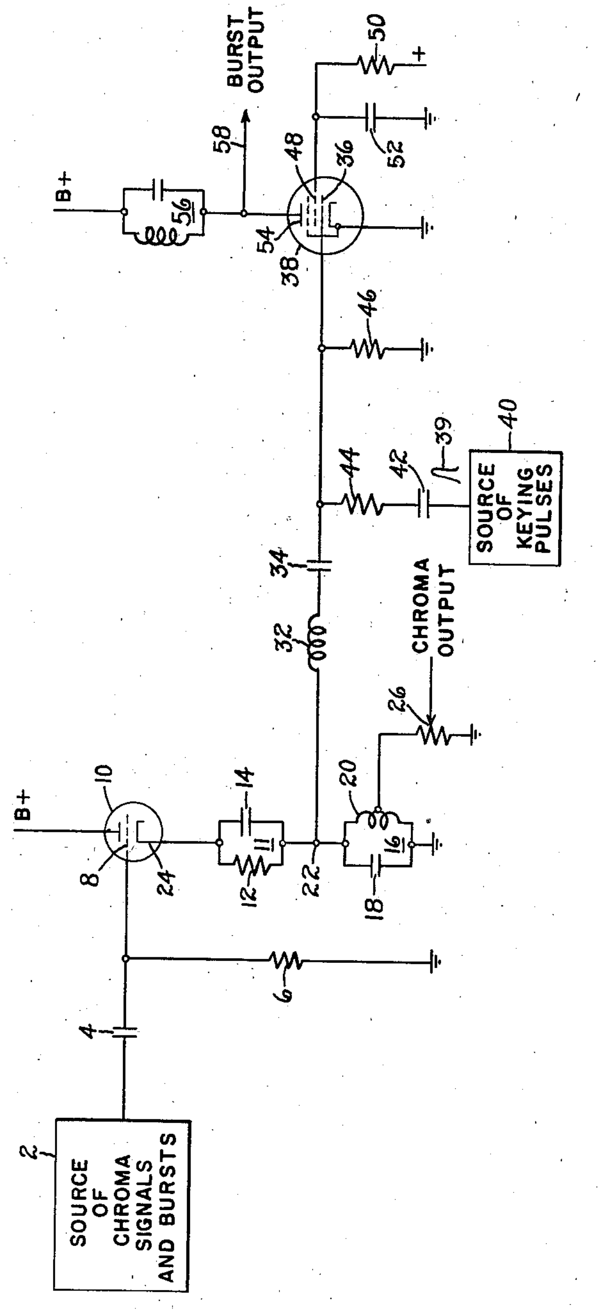
Inventor:
Wolf J. Gruen,
by Donald N. Timbie
His Attorney.

2,837,595
Patented June 3, 1958

2,837,595

SIGNAL SEPARATION CIRCUIT

Wolf J. Gruen, Syracuse, N. Y., assignor to General Electric Company, a corporation of New York Application February 1, 1954, Serial No. 407,448

7 Claims. (Cl. 178—5.4)

This invention relates to a gating circuit for extracting a desired intermittent signal from a train of signals.

Although this circuit has many applications, it has been found extremely useful in receivers adapted for operation in a color television system such as set forth in pages 90 to 93 of the August 1951 issue of Electronics. In this system, as is now well known by those skilled in the art, a part of the color information is conveyed by amplitude and phase modulation of a subcarrier having a frequency lying in the upper end of the video spectrum. The color information conveyed by the carrier is extracted by heterodyning it and its sidebands in synchronous detectors with different predetermined quadrature phases of a reference wave having the same frequency as the color carrier.

Information as to the proper phase of the reference wave is derived from bursts of several cycles of a predetermined phase of the color carrier frequency that are injected after the line scanning synchronizing signals. It is apparent that the bursts must be clearly separated from the signal train before they are used in aiding the generation of the reference wave as the inclusion of other signals having random phase would change the phase of the reference wave.

It is accordingly, an object of this invention to provide an economical circuit that can be used to extract the bursts noted above from the rest of the signal train.

As noted above, the color carrier and its sidebands are applied to the synchronous detectors. Since the cycles in the burst are of the same frequency as the color carrier, they too are applied to the synchronous detectors. If the bursts have too much amplitude, it has been found that under certain conditions, the D. C. restorers associated with the synchronous detectors establish an incorrect D. C. level. When this occurs, proper color balance is lost and the colors in the image produced are incorrect.

Accordingly, it is a further object of this invention to provide a signal separation circuit that operates to reduce the amplitude of the bursts before they are applied to the synchronous detectors.

Briefly, these objectives may be achieved in accordance with this invention as follows: The input of a driving circuit is connected to a source of signals including the color carrier, its sidebands and the bursts. Its output is coupled to the synchronous detectors and the burst gating circuit. The normally closed gating circuit is opened by suitable gating pulses so as to let the bursts pass to the reference wave generating means. The arrangement is such that the opening of the gating circuit reduces the amplitude of the bursts supplied by the driving circuit to the synchronous detector.

The manner in which the objects noted above may be attained by a signal separation circuit constructed in accordance with this invention will be better understood after the following consideration of the particular embodiment of the invention shown in the drawing.

In a manner well known to those skilled in the art, the bursts and the color subcarrier and its sidebands, hereinafter referred to as the chroma signal, may be separated from the rest of the signals by a source 2. The burst and the chroma signal are coupled via a capacitor 4 and a grid leak resistor 6 to a grid 8 of an electron discharge device 10 that operates as a cathode follower. Other types of driver stages could be used but for reasons which will be subsequently explained, it is desirable that the driver stage have a low impedance output. Bias for the electron discharge device 10 is developed by circuit 11 comprised of a resistor 12 and a capacitor 14 connected in parallel. The burst and the chroma signal appear across a parallel tuned circuit 16 comprised of a capacitor 18 and an inductance 20. The bias circuit 11 and the tuned circuit 16 are joined at a junction 22 and are connected in series between the cathode 24 of the electron discharge device 10 and ground. A suitable proportion of the chroma signal appearing across the tuned circuit 16 may be coupled to synchronous detectors (not shown) by connecting a potentiometer 26 across a desired portion of the inductance 20. As is well understood by those skilled in the art, the arrangement just described presents a low impedance to the synchronous detectors. In general this is desirable as it reduces any cross-talk that might be coupled from one synchronous detector to another. Furthermore, for reasons set forth below, this low impedance is desirable in the signal separating circuit of the present invention.

The following discussion relates to means for separating the bursts appearing at the junction 22, from the chroma signal also appearing at this junction in such manner that the relative amplitude of the bursts appearing at the potentiometer 26 is reduced. As previously pointed out, this is desirable as it prevents the bursts from upsetting the operation of the D. C. restorers associated with the synchronous detectors. A series circuit comprised of an inductance 32 and a capacitor 34 that are resonant at the frequency of the waves in the burst serves to couple the bursts from the junction 22 to a grid 36 of an electron discharge device 38. Positive pulses 39 supplied by a source 40 are coupled to the grid 36 by a capacitor 42 and a resistor 44. A grid leak resistor 46 is connected in the usual manner between the grid 36 and ground. If the source 40 of the pulses 39 is a coupling to the horizontal deflection yoke, the pulses occur approximately at the same time as the bursts but may precede it. In this situation the capacitor 34 and the parallel combination of the resistors 44 and 46 may be of such value as to delay the pulses so that they coincide with the burst. This technique is well known to those skilled in the art and need not be considered further. During the pulses 39, the grid 36 draws current and the electron discharge device 38 is capable of amplifying the burst. In this particular example, the screen 48 of the electron discharge device 38 is connected to a positive potential by a resistor 50 and a by-pass capacitor 52, and the plate 54 is connected to B+ via a tank circuit 56 tuned to the burst frequency. Hence the burst appears in amplified form on an output lead 58 that is connected to the plate 54. The tank circuit 56 prevents the keying pulses 39 from appearing on the lead 58.

During the pulses 39, the grid 36 draws current, as previously described, and the capacitors 34 and 42 are charged. In between the pulses 39 the charge on the capacitors cuts off the electron discharge device 38 so as to prevent the chroma signal appearing at the junction 22 from reaching the burst output lead 58.

When the grid 36 conducts, the impedance between it and ground is reduced from a comparatively high value to a low value that is comparable in magnitude to the impedence between the junction 22 and ground. If these two impedances are equal, the amplitude of the burst in the tuned circuit 16 is half of what it would be if the grid 36 is an open circuit. The larger the impedance of the grid 36 to ground with respect to the impedance of the junction 22 to ground, the larger is the amplitude of the burst at the output lead 58 and in the tuned circuit 16 and vice versa. The relative values of these impedances can be adjusted to fit a given application and is determined by the minimum amplitude of the burst required on the burst output lead 58 and the maximum burst amplitude permissible in the tuned circuit 16.

The series tuned circuit comprised of inductance 32 and the capacitor 34 is resonant at the burst frequency so as to present a low impedance path thereto, but it presents a high impedance for the frequencies of the pulses 39. If the series circuit were not used, the low impedance of the tuned circuit 16 would effectively short-circuit the source 40 of the pulses 39.

The circuit operates in a similar manner if the source 2 provides the entire intelligence signal of the system rather than just the chroma signal and the burst. However, a band pass filter, not shown, should then be inserted in the chroma output lead so as to prevent undesired frequency components from reaching the synchronous detector. If the keying pulses 39 are flyback pulses, they might be of such duration as to permit both the synchronizing pulses and the bursts to pass through the gating amplifier 38. However, the tuned circuit 56 presents such a low impedance to the synchronizing pulses that they do not appear on the lead 58 with any appreciable magnitude.

In some receivers it may be desirable to operate the synchronous detectors at the intermediate frequency level of the chroma signal. In this event the source 2 would provide the burst and chroma signal at the intermediate frequency level. As is apparent to those skilled in the art, this can be done by coupling a band pass filter to an output of the intermediate frequency amplifier. The circuits 16 and 56 would then be tuned to the intermediate frequency of the bursts and the color subcarrier. The inductance 32 and the capacitor 34 would be series resonant at the intermediate frequency of the burst.

While I have shown and described a specific embodiment of my invention, I do not desire my invention to be limited to the particular form shown and described, and I intend by the appended claims to cover all modifications within the spirit and scope of my invention.

What I claim as new and desire to secure by Letters Patent of the United States is:

1. A circuit for separating bursts of alternating current waves that are repeated in a signal train at a frequency that is less than the frequency of the alternating current waves from a train of signals having components of the same frequency as the alternating current waves comprising in combination a low impedance driving source having an output across which the bursts and the signals appear, a gating amplifier having at least a plate, a grid and a grounded cathode, a source of positive pulses each of which occurs at the same time as one of the bursts, means for coupling the output of said source of positive pulses to said grid so as to cause it to draw current and hence have an impedance comparable to that of said driving source, said coupling means being of such nature as to maintain said grid at a cut-off potential between the positive pulses, and a series resonant circuit tuned to the frequency of the waves in said burst coupled between said low impedance driving source and said grid.

2. A circuit for separating intermittent bursts of alternating current waves from a train of signals comprising in combination a low impedance driving source adapted to receive the train of signals said driving source having an output circuit across which the train of signals including the burst may appear, an amplifier having an input circuit and an output circuit, a series resonant circuit tuned to the frequency of the alternating waves within the bursts, means for coupling said tuned circuit between said driving source and said input circuit of said amplifier, means for making said amplifier capable of passing signals to its output circuit only during said bursts and for reducing the impedance of its input circuit during said bursts.

3. A circuit for separating intermittent bursts of alternating current waves from a train of signals and for providing a source of the train of signals in which the amplitude of the bursts is minimized, comprising in combination, a driving source having an input circuit and an output circuit, said output circuit having a predetermined amount of impedance, an amplifier having an input circuit and an output circuit, a series resonant circuit tuned to the frequency of the alternating current waves, means for connecting said series tuned circuit between said output circuit of said driving source and said input circuit of said amplifier, keying means coupled to said input circuit of said amplifier for rendering said amplifier capable of passing signals to its output circuit during the bursts, said keying means being adapted to reduce the impedance of said input circuit of said amplifier to a value of having the same order of magnitude as the predetermined impedance of said output circuit of said driving source during said bursts so that the amplitude of the bursts in said driving circuit are reduced in amplitude.

4. In a color television receiver adapted to reproduce images in response to a signal train having a chrominance signal comprised of a modulated subcarrier and wherein the chroma information is derived by heterodyning said chrominance signal with a reference wave of the color carrier frequency and wherein means are provided for controlling the phase of said reference wave in response to bursts of a predetermined phase of said color carrier frequency, the bursts occurring after line scanning synchronizing pulses, a circuit for separating the bursts and also providing a source of the chroma signal in which the amplitude of the bursts is reduced, comprising in combination a driving source having an input circuit adapted to receive this signal train including the bursts and the chroma signal, said source also having an output circuit having a predetermined impedance across which the chroma signal and the bursts appear, thus providing an output for the chroma signal, an amplifier having an input circuit including a control grid electrode, a series resonant circuit tuned to the frequency of the carrier wave, means for coupling said tuned circuit between said output circuit of said driving source and said grid electrode, means coupled to said grid electrode for making it draw current during the bursts and thereby to render said amplifier capable of passing the bursts to its output circuit and also to cause said input impedance of said amplifier to have a value comparable to the impedance of said output circuit of said driving means so that said output circuit is loaded down during said bursts thereby reducing the amplitude of the bursts at the output for the chrominance signal.

5. In a color television receiver adapted to reproduce images in response to a signal train having a chrominance signal comprised of a modulated subcarrier and wherein the chroma information is derived by heterodyning said chrominance signal with a reference wave of the color carrier frequency and wherein means are provided for controlling the phase of said reference wave in response to bursts of a predetermined phase of said color carrier frequency, the bursts occurring after line scanning synchronizing pulses, a circuit for separating the bursts and also providing a source of the chroma signal in which the amplitude of the bursts is reduced comprising in combination a cathode follower stage adapted to receive the train of signals, said cathode follower stage having in its cathode circuit a parallel resonant circuit tuned to the frequencies of the chrominance signal and the burst, an amplifier having a plate, a control grid and a cathode, a grid leak resistor connected between said grid and ground, means for effectively grounding said cathode, a series resonant circuit tuned to the burst frequency, means for coupling said series circuit between said parallel resonant circuit and said grid, a source of positive pulses that occur at the same time as the burst, means including a capacitive means for coupling said source to said grid in order that the grid may draw current during the positive pulses and that the charge thus produced on said capacitive means may cut off said amplifier during the time between the positive pulses.

6. In a color television receiver adapted to reproduce images in response to a signal train having a chrominance signal comprised of a modulated subcarrier and wherein the chroma information is derived by heterodyning said chrominance signal with a reference wave of the color carrier frequency and wherein means are provided for controlling the phase of said reference wave in response to bursts of a predetermined phase of said color carrier frequency, the bursts occurring after line scanning synchronizing pulses, a circuit for separating the bursts and also providing a source of the chroma signal in which the amplitude of the bursts is reduced, comprising in combination a driving source having an input circuit adapted to receive this signal train including the bursts and the chroma signal, said source also having an output circuit having a predetermined impedance across which the chroma signal and the bursts appear, thus providing an output for the chroma signal, an amplifier having an input circuit and an output circuit, circuits for coupling said input circuit to the output of said driving source, electronic keying means for rendering said amplifier capable of passing signals from its input circuit to its output circuit during said bursts, said keying means being adapted to reduce the apparent impedance of said input circuit of said amplifier so that the amplitude of the bursts at said output circuit of said driving source is reduced.

7. In a color television receiver adapted to reproduce images in response to a signal train having a chrominance signal comprised of a modulated subcarrier and wherein the chroma information is derived by heterodyning said chrominance signal with a reference wave of the color carrier frequency and wherein means are provided for controlling the phase of said reference wave in response to bursts of a predetermined phase of said color carrier frequency, the bursts occurring after line scanning synchronizing pulses, a circuit for separating the bursts and also providing a source of the chroma signal in which the amplitude of the bursts is reduced, comprising in combination a driving source having an input circuit adapted to receive this signal train including the bursts and the chroma signal, said source also having an output circuit having a predetermined impedance across which the chroma signal and the bursts appear, thus providing an output for the chroma signal, an amplifier having an input circuit and an output circuit, circuits for coupling said input circuit to the output of said driving source, electronic keying means for rendering said amplifier capable of passing signals from its input circuit to its output circuit during said bursts, said keying means being adapted to reduce the apparent impedance of said input circuit of said amplifier to a value comparable to the impedance of said output circuit of said driving source, so that the amplitude of the bursts at said output circuit of said driving source is reduced.

References Cited in the file of this patent

UNITED STATES PATENTS

| | | |
|---|---|---|
| 2,594,380 | Barton | Apr. 29, 1952 |
| 2,713,608 | Sonnenfeldt | July 19, 1955 |